US010178824B1

(12) United States Patent
Chupp

(10) Patent No.: US 10,178,824 B1
(45) Date of Patent: Jan. 15, 2019

(54) SWEEP PLOW IMPLEMENT

(71) Applicant: Daniel Wayne Chupp, Quinter, KS (US)

(72) Inventor: Daniel Wayne Chupp, Quinter, KS (US)

(*) Notice: Subject to any disclaimer, the term of this patent is extended or adjusted under 35 U.S.C. 154(b) by 0 days.

(21) Appl. No.: 15/251,451

(22) Filed: Aug. 30, 2016

Related U.S. Application Data

(60) Provisional application No. 62/212,872, filed on Sep. 1, 2015.

(51) Int. Cl.
*A01B 3/26* (2006.01)
*A01B 13/00* (2006.01)
*A01B 35/08* (2006.01)
*A01B 63/16* (2006.01)

(52) U.S. Cl.
CPC ................ *A01B 63/16* (2013.01); *A01B 3/26* (2013.01); *A01B 13/00* (2013.01); *A01B 35/08* (2013.01)

(58) Field of Classification Search
CPC .......................................... A01B 13/00–13/16
See application file for complete search history.

(56) References Cited

U.S. PATENT DOCUMENTS

| | | | | | |
|---|---|---|---|---|---|
| 1,908,903 | A | * | 5/1933 | Kovar | A01B 35/225 172/724 |
| 2,337,777 | A | * | 12/1943 | Seaholm | A01B 35/26 172/722 |
| 2,692,544 | A | * | 10/1954 | Jessup | A01B 49/00 171/64 |
| 3,155,168 | A | * | 11/1964 | Telecky | A01B 35/30 172/484 |
| 3,807,507 | A | * | 4/1974 | Hecker | A01B 13/08 172/175 |
| 4,823,884 | A | * | 4/1989 | McCall | A01B 13/08 172/508 |
| 5,398,770 | A | * | 3/1995 | Harden | A01B 13/08 172/140 |
| 5,409,068 | A | * | 4/1995 | Hake | A01B 13/10 172/139 |
| 5,649,601 | A | * | 7/1997 | Nash | A01B 35/18 172/194 |
| 8,684,103 | B2 | * | 4/2014 | Henry | A01C 5/062 111/152 |

* cited by examiner

*Primary Examiner* — Tara Mayo-Pinnock
(74) *Attorney, Agent, or Firm* — Robert O. Blinn

(57) ABSTRACT

A sweep plow implement includes a frame, sweep plow assemblies, wheel assemblies and actuators. Each sweep plow assembly is mounted to the frame by a standard which extends down from the frame. Each wheel is supported by a triangular structure which straddles the standard and which includes a wheel strut which is pivotably mounted to the frame forward of the wheel and carries the wheel at its distal end. An actuator connects between the frame and each wheel strut. When the actuator is extended, the frame is lifted to a maximum height and when the actuator is retracted, the frame is lowered to a minimum height. When the actuator is retracted sufficiently, the sweep plow assembly is at an elevation suitable for drafting the sweep plow assembly through farm ground soil.

5 Claims, 5 Drawing Sheets

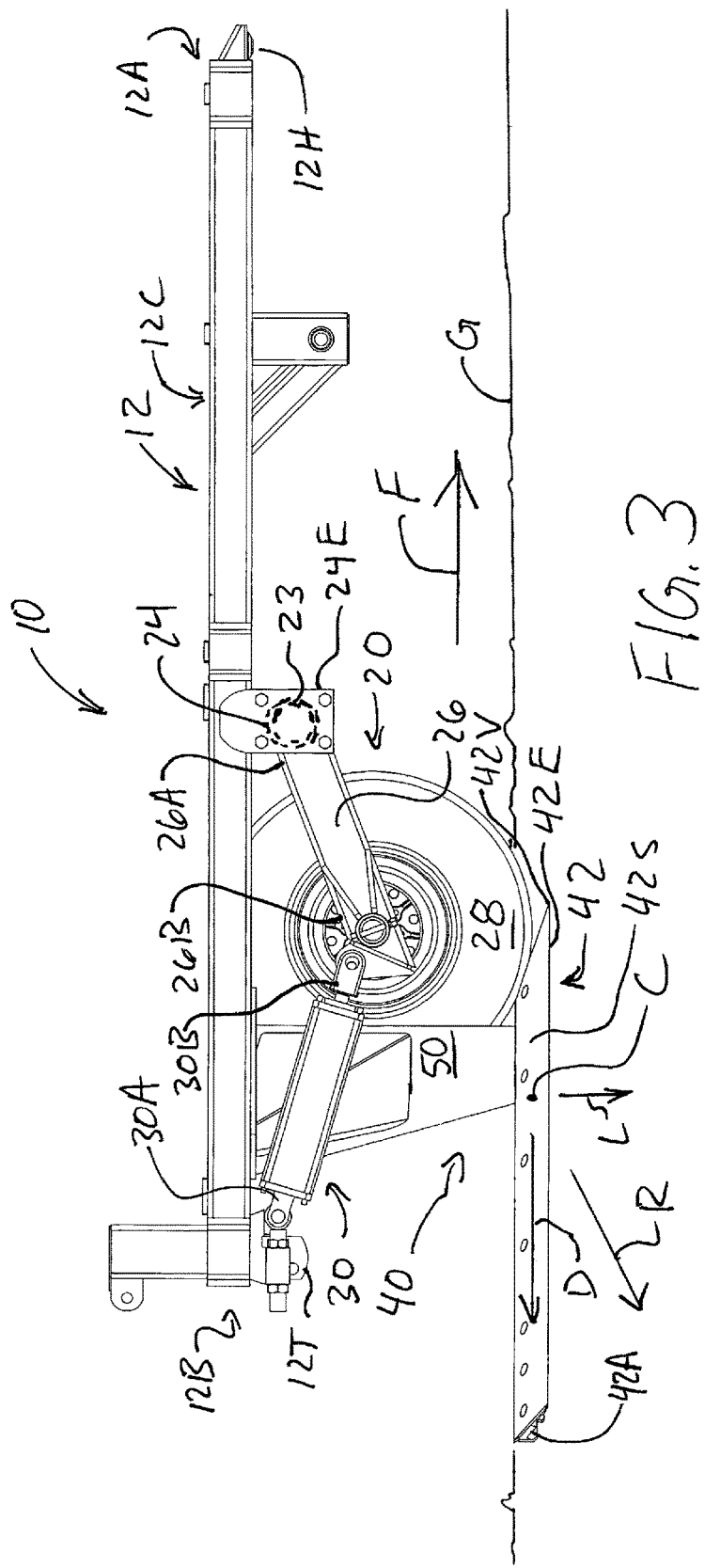

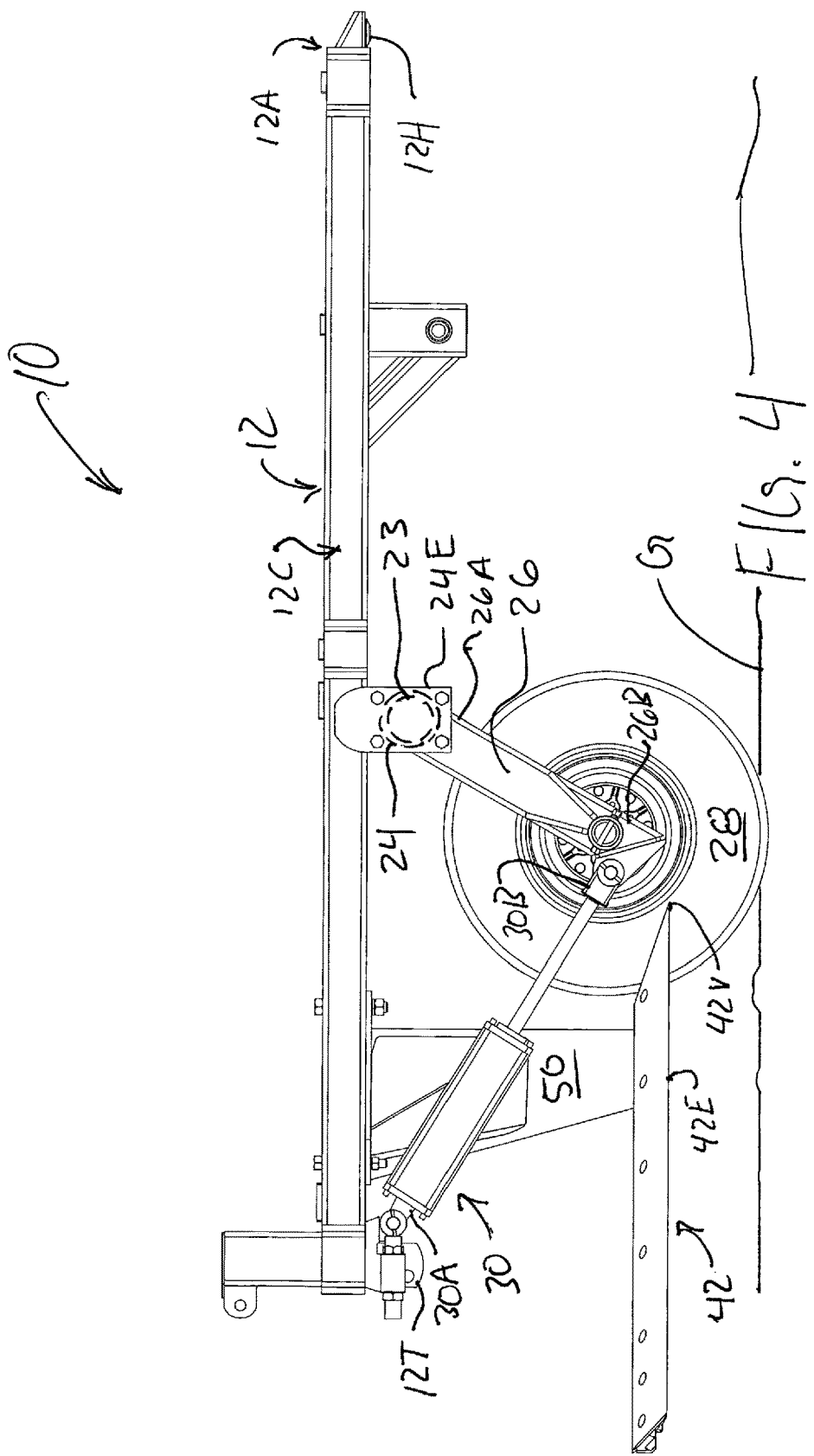

SWEEP PLOW IMPLEMENT

CROSS REFERENCES TO RELATED APPLICATIONS

This application claims the benefit of U.S. Provisional Patent Application No. 62/212,872 filed on Sep. 1, 2015 which is incorporated herein by reference.

FIELD

This invention relates to a sweep plow implement.

BACKGROUND

Sweep plows are implements used for disrupting and destroying weeds growing in farm ground. Sweep plows are used in dryland soil common, for example, in areas of western Kansas, southwestern Nebraska and western Oklahoma. The advent of "ROUNDUP READY®" crops and the heavy use of herbicides such as ROUNDUP®, caused sweep plows to fall into disuse. However, in recent years ROUNDUP® resistant weeds have evolved which has revived the need for sweep plow implements.

Generally, a sweep plow implement includes a wheel-supported frame which is arranged to be pulled by a tractor. The frame of a sweep plow implement carries a pattern of sweep plow assemblies which include sweep plow blade assemblies and standards which rigidly mount the sweep plow blade assemblies to the frame. The elevation of the sweep plow blade assemblies is adjusted by adjusting the spacing between the wheels and the frame. Typically, during operation, the sweep plow blades are drafted through the soil just a few inches beneath the soil surface. The passage of the blade beneath the surface of the soil cuts and disrupts weed root systems. Other devices, such as "mulch treaders" mounted on the implement are also adapted to overturn the weeds so that the weeds do not reestablish. As sweep plow blades are drafted through the soil, considerable loads are transferred by the blades into the standards supporting the blade assemblies. Typically, each blade acts as an inverted foil which receives a downward force as well as significant drag. The resultant draft force may be envisioned as originating at the centroid of the sweep plow blade assembly and is directed rearward and down at about 30 degrees. A difficulty encountered with present sweep plow implements is that the draft forces acting on the sweep plow assemblies exert twisting moments on the frame structure. The resulting twisting of the frame causes the sweep plows to tilt downwardly and become misaligned. Another difficulty arises because the hydraulic cylinders which actuate the wheel assemblies and thereby control the elevation of the frame and sweep plow assemblies usually connect between the frame and an arm which extends up from a rockshaft which carries the wheel assemblies. When the wheels encounter a bump, the rockshaft acts as a torsional spring which allows the implement to bounce. Both the frame bending effect and the rockshaft torsion effect often forces an operator to increase the depth of the sweep plows to maintain the outboard tips of the sweep plow blades beneath the surface and to stabilize the implement from bouncing. This, in turn, causes the cutting action to be less precise and increases the power needed to draft the implement. Accordingly, what is needed is a sweep plow implement in which twisting moments on the frame and the bouncing action of the wheel assemblies are minimized so that sweep plow blade depth can be maintained with precision at a selected shallower depth.

SUMMARY

The above noted need is addressed by a sweep plow implement having a frame, a sweep plow assembly and a carriage assembly. The frame is arranged generally horizontally and extends longitudinally between a front-end and a back-end and transversely between a left side and a right side. Each carriage assembly includes a pair of wheel struts, a pair of actuators and wheels. The wheel struts are pivotably mounted to the frame and are preferably spaced apart in the transverse direction. Each wheel strut presents a distal end to which a wheel is rotatably mounted. Each wheel is suitable for traversing a ground surface. Each actuator is preferably pivotably mounted at its proximal end to the frame at a second longitudinal frame location and is preferably generally aligned in the transverse direction with a wheel strut. The distal end of each actuator is also pivotably mounted to the distal end of a wheel strut. The first and second longitudinal frame locations are spaced away from each other in the longitudinal direction and are disposed between the front-end and the back-end of the frame. The sweep plow assembly includes a standard and a blade assembly. The blade assembly is fixed to the standard and the standard is fixed to the frame at a third longitudinal frame location which is located between the first and second longitudinal frame locations. The sweep plow is arranged so that the blade assembly is supported in a parallel fashion below the frame. The actuators are able to adjustably move in unison between an extended position which maximizes the elevation of the frame above the ground surface and a retracted position which minimizes the elevation of the frame above the ground surface. When the frame height is maximized, the sweep plow assembly is elevated above the ground so that the implement can be transported over the ground. When the frame height is properly adjusted between the extended position and the retracted position, the sweep plow blades may be positioned beneath the surface of the soil at a level which is suitable for cutting and destroying the roots of weeds as the sweep plow is drafted through farm ground soil. Because each wheel is supported by a truss-like triangular structure defined by the frame, an actuator and a wheel strut and because each triangular structure longitudinally straddles a standard which supports a sweep plow assembly, the amount by which the frame twists and flexes in response to the draft forces from the sweep plow blades is minimized so that the depth of the sweep plow blades beneath the surface of the soil may be minimized and precisely controlled.

BRIEF DESCRIPTION OF THE DRAWINGS

FIG. 3 is a side view of the center portion of one embodiment of the sweep plow implement shown with one wheel removed for clarity and shown with the actuators in a retracted position such that the sweep plow blade is at a suitable elevation below the surface of the soil.

FIG. 4 is a second side view of the center portion of one embodiment of the sweep plow implement shown with one wheel removed for clarity and shown with the actuators in the extended position for transport.

DETAILED DESCRIPTION

Figure 1:
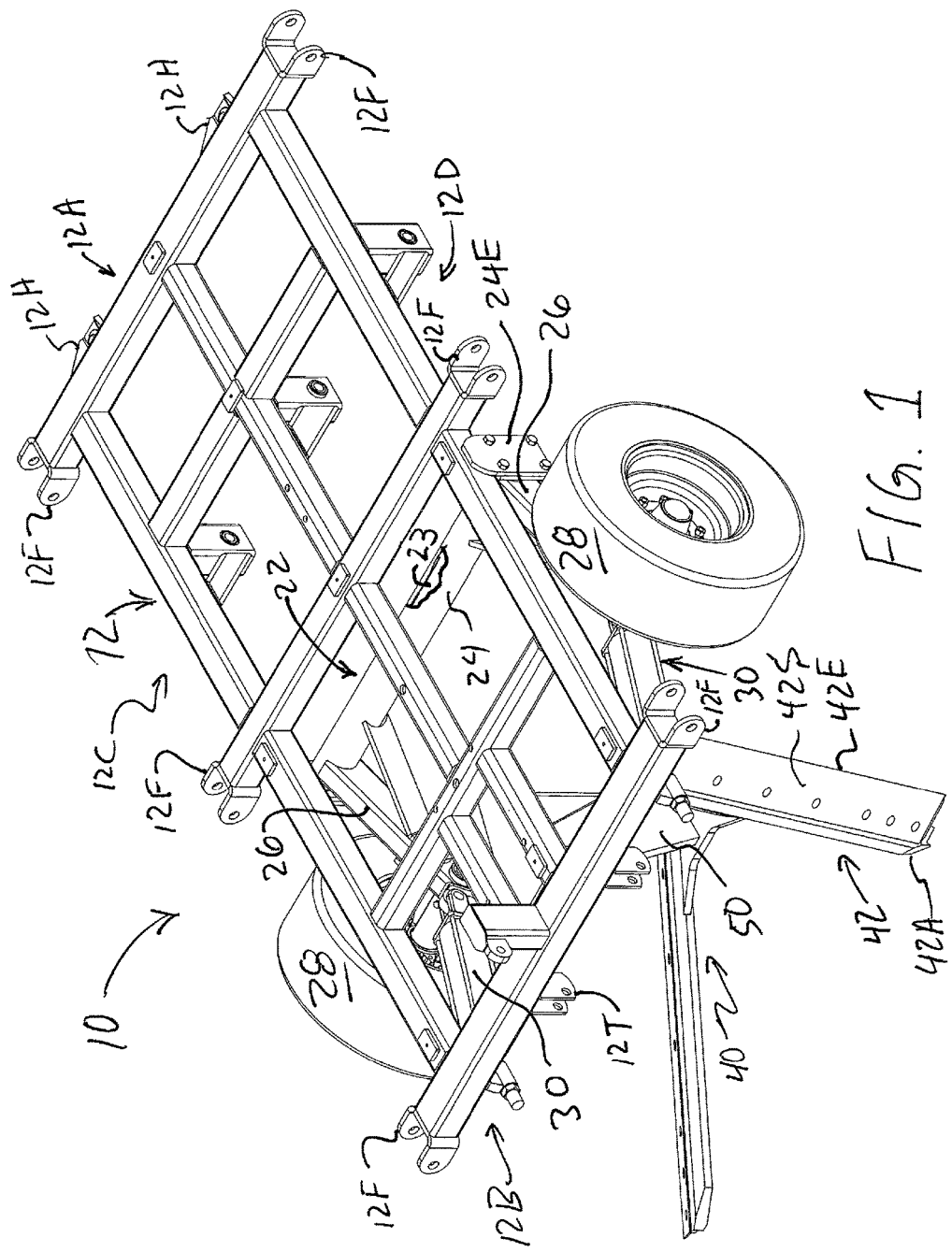
FIG. 1 is a first perspective view of the center portion of one embodiment of a sweep plow implement.

Referring to the figures, FIG. 1 provides a perspective view of one embodiment of a center portion of a sweep plow implement 10. As can be seen in FIGS. 1 and 3, sweep plow implement 10 includes a frame 12, a carriage assembly 20 and a sweep plow assembly 40. Sweep plow assembly 40 includes a sweep blade assembly 42 and an upright standard 50. Sweep plow blade assembly 42 is fixed to the lower end of standard 50 and standard 50 is, in turn, fixed to frame 12. Carriage assembly 20 is adapted to adjustably support frame 12 so that frame 12 may be elevated to a raised transport position in which sweep plow blade assembly 42 is elevated above ground level so that sweep plow implement 10 may pulled across the ground. Carriage assembly 20 is also adapted so that frame 12 may be adjustably lowered to an elevation which corresponds to positioning the blades of sweep plow blade assemblies 42 just below the surface of the soil for the purpose of destroying weeds as sweep plow implement 10 is drafted across the ground. Sweep plow implement 10 is arranged to operate over a ground surface G indicated in FIG. 3 and to be drafted in a forward direction indicated by arrow F which is also indicated in FIG. 3.

The skilled reader should appreciate that sweep plow implement 10 as shown in FIGS. 1-4 is merely one portion, or, more particularly, "a center frame" of a larger implement which will typically include a plurality of "frames" which are pinned together at fittings 12F. Each such frame would be supported by a carriage assembly which is essentially identical to carriage assembly 20 and would also include a sweep plow assembly which is generally identical to sweep plow assembly 40. Similarly, the sweep plow assembly would also be mounted to the frame by a standard which would be generally identical to standard 50. Since the plurality of frames may be pinned together at fittings 12F, the implement portions would be able to follow the terrain if it varies in elevation from right to left. Still further, other implement portions may be pinned to fittings 12T at the back-end of frame 12. The skilled reader will appreciate that such other implement portions may present "mulch treaders" which are adapted to flip disrupted weeds root side up to prevent weeds from re-establishing as are well known to those skilled in the art. Frame 12 may be considered as extending longitudinally between a front-end 12A, and a back-end 12B and transversely between a left side 12C and a right side 12D. In this example, the front-end 12A of frame 12 also presents two hitch fittings 12H which are suitable for connecting to a hitch arrangement of a tractor (not shown).

As can be seen in FIGS. 1 and 3, in this example, carriage assembly 20 further include a rockshaft assembly 22, wheel struts 26, wheels 28 and actuators 30. As can be best seen in FIG. 1, in this example, rockshaft assembly 22 includes a rockshaft tube 23 which is fixed to frame 12 by end plates 24E. A cylindrical rockshaft 24 surrounds and receives rockshaft tube 23 so that rockshaft 24 is rotatably carried by rockshaft tube 23. In FIG. 1, a portion of rockshaft 24 is broken away to expose rockshaft tube 23. In this example, wheel struts 26 are fixed at opposite ends of rockshaft 24 and are arranged to be oriented at the same angle so that they are generally parallel and move in unison. The skilled reader will appreciate that the above described rockshaft assembly is merely one way to pivotably mount the proximal ends of wheel struts 26 to frame 12 so that struts 26 move in unison. The use of rockshaft 24 insures that wheels 28 which support frame 12 are uniformly spaced away from frame 12 so that frame 12 is generally parallel to the ground surface in the transverse direction. This insures that the blade of the sweep plow is also held in a position that is at least more likely to be parallel to the ground surface. Each wheel strut 26 has a proximal end 26A and a distal end 26B. Wheels 28 are rotatably mounted to each wheel strut 26 at a distal end 26B of each wheel strut 26. Wheel struts 26 are arranged, in this example, so that wheel struts 26 are pivotably connected, at least indirectly to frame 12 at a first longitudinal frame location FL1 and, in this example, slant generally downwardly and rearwardly when considering the direction of travel of sweep plow implement 10.

In this example, a set of actuators 30 extend between frame 12 and the distal end 26B of each wheel strut 26. Actuators 30, in this example, are hydraulic cylinders which are of a well-known type which are able to be fixed at a selected amount of extension. As can be seen in FIG. 4, each actuator 30 has a proximal end 30A and a distal end 30B. As is typical for a hydraulic actuator in this type of arrangement, each actuator 30 is pivotably connected at its proximal end 30A to frame 12 at a second longitudinal frame location FL2. Each actuator 30 is also pivotably connected at its distal end 30B to the distal end of a wheel strut 26. Each actuator 30 is preferably connected to frame 12 at frame location FL2 so that the connection is farther aft than standard 50 which supports sweep plow 42. Further, actuators 30 are preferably connected in a hydraulic system (not shown) which is able to move actuators 30 in unison so that the spacing between wheels 28 and frame 12 is uniform across frame 12 and even an extended implement which might include two or more frames and two or more sweep plow assemblies. Preferably, actuators 30, at least in this example, may be part of a phasing hydraulic cylinder arrangement wherein the hydraulic cylinders of a center section should be master cylinders and wherein slave hydraulic cylinders having progressively smaller diameters would be used in the outboard sections. Such a hydraulic system arrangement is well-known to those skilled in the art. Other hydraulic system arrangements may be selected or even other types of actuators may be selected as long as the degree of extension of actuators 30 across the implement does not vary once selected and remains uniform across the implement.

Actuators 30 are able to move between a contracted position in which frame 12 is at a minimum elevation as shown in FIG. 3 and an extended position in which frame 12 is raised to a maximum elevation as shown in FIG. 4. When actuators 30 are in the extended position, frame 12 is raised at a maximum elevation so that blade assemblies 42 are raised above ground surface G thus making it possible to transport sweep plow implement 10 over the ground.

Figure 2:
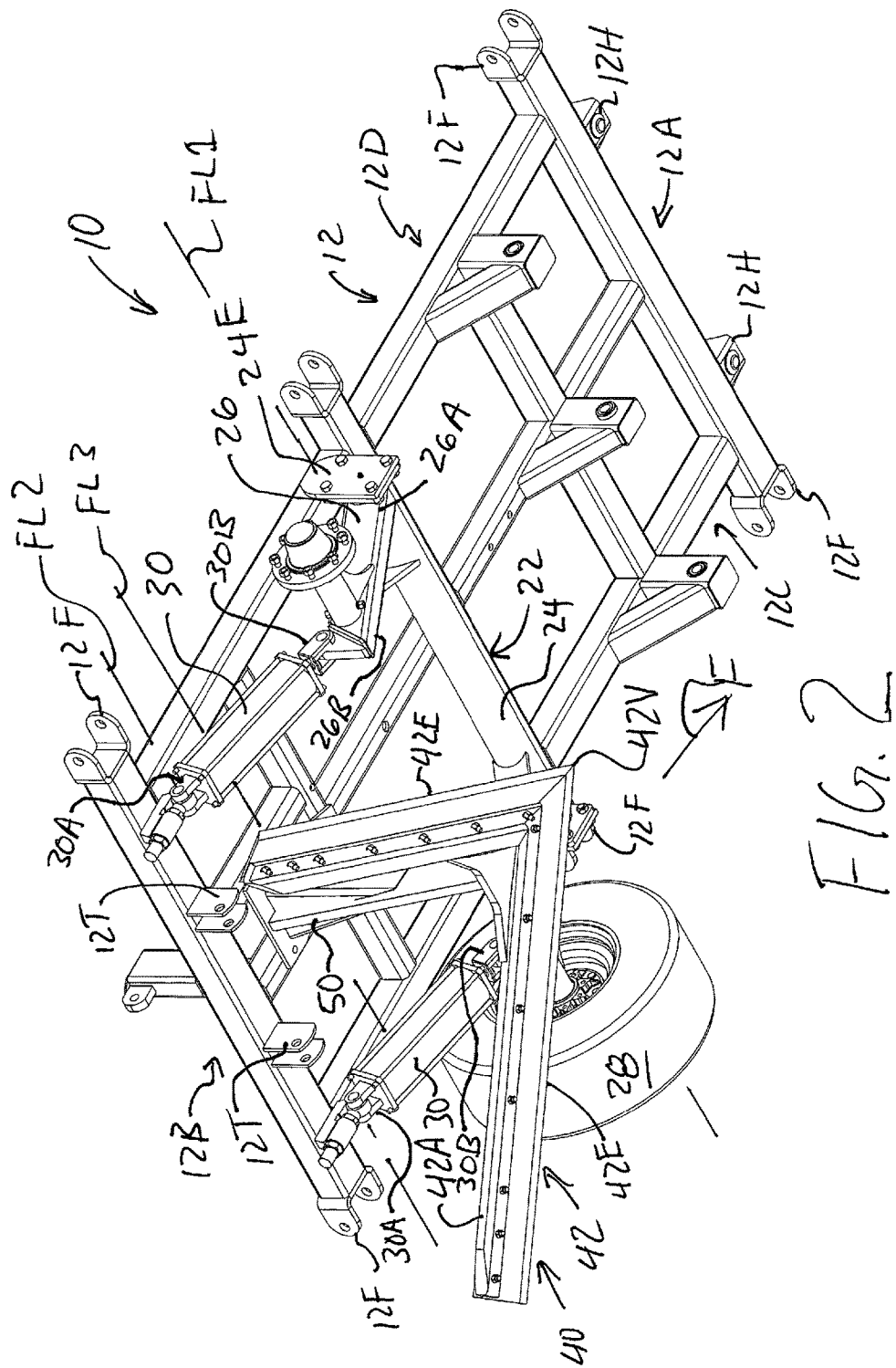
FIG. 2 is a second perspective view of the center portion of one embodiment of the sweep plow implement shown with one wheel removed for clarity.

As can be seen in FIG. 3, sweep plow assembly 40 includes a sweep plow blade assembly 42 and a standard 50. As can be seen in FIG. 2, each sweep plow blade assembly 42 is fixed to frame 12 by standard 50 which extends between each blade assembly 42 and frame 12. As can be seen in FIG. 3, standard 50 is fixed to frame 12 at a third longitudinal frame location FL3 which is longitudinally positioned between first and second longitudinal frame locations FL1 and FL2.

The term "longitudinal frame location" as used herein is intended to indicate the spacing of the longitudinal frame location in relation to the front end of the frame and the back end of the frame but not necessarily in relation to the left side or the right side of the frame. So, while standard 50 may be said to be at a longitudinal frame location which is between the longitudinal frame locations of the proximate ends of wheel struts 26 or the proximate ends of actuators 30, that does not necessarily mean that standard 50 is actually located between a proximate end of a wheel strut 26 and a proximate end of an actuator 30. By noting that the longitudinal frame location of standard 50 is between the longitudinal frame locations of struts 26 and actuators 30, the applicant means that if the proximate ends of wheel struts 26, for example, are 40 inches from the front end of frame 12, and the proximate ends of actuators 30 are 70 inches from the front end of frame 12, then standard 50 is mounted between 30 and 70 inches from the front end of frame 12.

As can be best seen in FIG. 3, sweep plow blade assembly 42 is arranged in a generally V-shaped configuration when viewed from above or below. A vertex 42V of blade assembly 42 is arranged to be oriented in the forward (F) direction. Sweep plow blade assembly 42 is further arranged so that it presents a forwardly and downwardly sloped blade surfaces 42S which present sharp leading edges 42E. The applicant has found that sweep plow blade surface 42S is most effective when about 7 inches wide and when set at an angle of approximately 20° to 30° with respect to ground surface G. As sweep plow blade assembly 42 is drafted with leading edge 42E inches below the soil as shown in FIG. 3, it tends to act as an inverted wing. Thus, a downward negative lift force L results from the drafting motion. Yet, also, as each sweep plow blade assembly 42 is drafted through the soil, it also produces a drag force D. The resultant force R is the drafting force which may be considered as originating at the centroid C of sweep plow blade assembly 42. The resultant force R is transferred by standard 50 into frame 12. The horizontal drag force D is reacted at hitch 12H, while the downward, negative lift force L and the weight of sweep plow implement 10 is reacted by wheel 28.

As can be best seen in FIG. 3, when sweep plow implement 10 is operating, resultant force R is generally aligned with wheel strut 26. As can also be seen in FIG. 3, wheel strut 26, actuator 30 and frame 12 define a triangular structure which is spaced behind and in front of standard 50 and therefore reacts resultant force R transferred by standard 50 into frame 12 while minimizing the degree by which frame 12 bends. It is also likely that drag force D which is applied to standard 50 at the lower end of standard 50 causes a moment to be transferred into frame 12 where standard 50 is fixed to frame 12. But, as noted above, the attachment location for standard 50 is generally positioned behind wheels 18 and forward of the frame attach locations for actuators 30. Thus, the application of the moment from standard 50 does not cause any significant deflection of frame 12. Thus, the configuration shown in FIG. 3 minimizes the degree to which frame 12 deflects which further minimizes the degree to which sweep plow blade assembly 42 deviates from the level orientation shown in FIG. 3. This, in turn, allows precise control of the depth at which cutting edge 42E can be placed below the level of ground surface G. Even if the above explanations as to why sweep plow implement 10 is able to maintain cutting edge 42E at a relatively shallow depth with a high degree of control and accuracy and with very little deviation or deflection are in some respects erroneous, the applicant is able to attest that the configuration described above and as shown in the accompanying figures is in fact almost completely free of unwanted deflections when in use. This configuration allows very precise control of the depth of cutting edge 42E.

The various components described above are preferably fashioned from typical materials as are well known in the art. For example, frame 12, wheel strut 26 and rockshaft 24 would be preferably fashioned from a steel alloy. Blade surface 42S of blade assembly 42 may be fashioned from an unusually hard, high strength steel. Other components would be of conventional design and made from conventional materials as are well-known in the art.

Figure 3A:
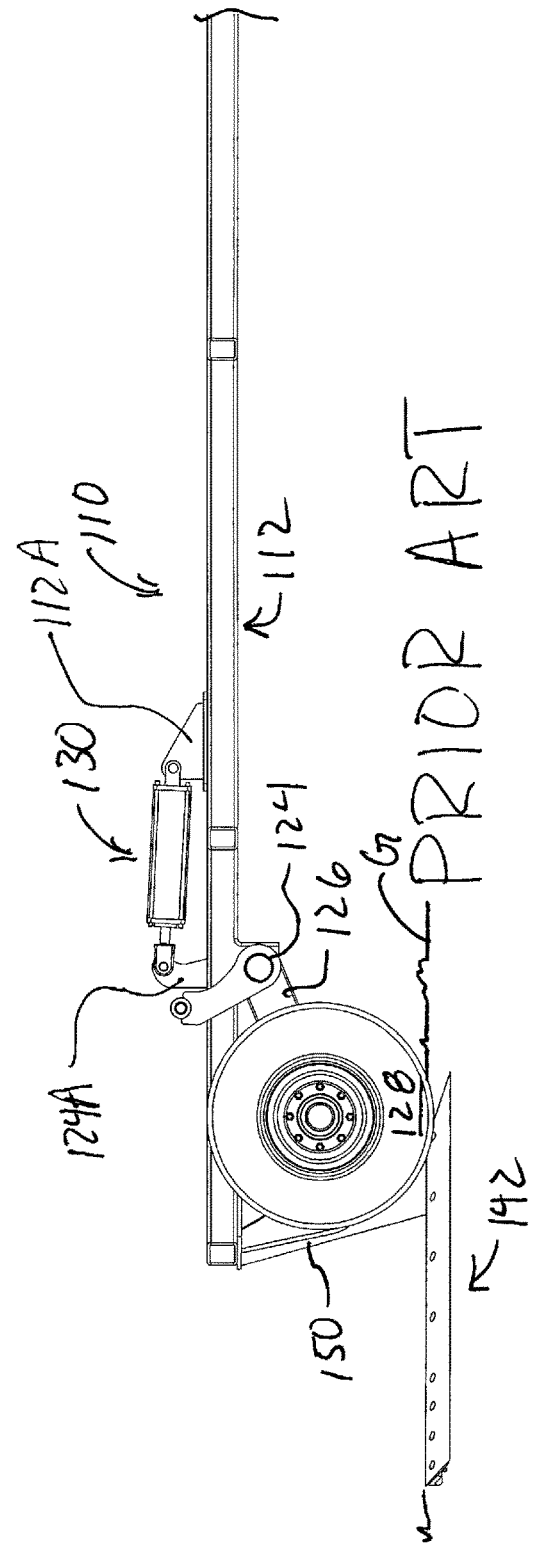
FIG. 3A is a side view of the center portion of a prior art sweep plow implement.

The advantages of sweep plow implement 10 may be better understood by referring to FIG. 3A which is a side view of a center section of prior art sweep plow implement 110. As can be seen in FIG. 3A, prior art implement 110 includes a frame 112 to which is rigidly mounted a standard 150 which, in turn, carries sweep plow blade assembly 142 as described above for sweep plow implement 10. A wheel assembly includes a wheel strut 126 and a wheel 128 which are arranged much like wheel strut 26 and wheel 28 of sweep plow implement 10. As in sweep plow implement 10, wheel strut 126 is fixed (typically by weldments) to a rockshaft 124 which is rotatably mounted to frame 112 in the same way as described above for sweep plow implement 10. An arm 124A is also fixed to rockshaft 124. However, as can be seen in FIG. 3A, the placement of hydraulic cylinder 130 is different for prior art implement 110. Hydraulic cylinder 130 connects between arm 124A and a bracket 112A which is fixed to frame 112. And, typically, one hydraulic cylinder 130 is used for center section 110 instead of one hydraulic cylinder for each wheel. Thus, extension and retraction of hydraulic cylinder 130, cause wheel strut 126 to rotate, thereby causing frame 112 to raise and lower.

The operating characteristics of prior art implement 110 differ significantly from those of sweep plow implement 10. The forces reacted by standard 150 from sweep plow blade assembly 142 must be transferred by frame 112 to be reacted by arm 124A and bracket 124A. This allows for considerable warping and bending of frame 112. Such warping and bending, renders it difficult to maintain sweep plow blade assembly 142 in a level orientation as shown in FIG. 3A. Accordingly, sweep plow blade assembly 142 tends to tilt in a nose down orientation which causes the outboard tips to be raised. The nose down tilt also causes an increase in drag and negative lift which, in turn, causes larger bending forces to be transmitting into frame 112. The nose down tilt may also motivate the operator to place sweep plow blade assembly 142 at a lower lever so that the outboard portions of the blade are still below ground level. A second problem encountered due to the prior art arrangement is that since one hydraulic cylinder 130 is connected to rockshaft 124 which serves two wheel assemblies, a span of rockshaft 124 necessarily exists between arm 124A and wheel struts 126. This, in effect, interposes a torsional spring between the wheel assemblies and frame 112. Thus, when, wheel 128 encounters a bump, strut 126 is displaced as rockshaft 124 is deflected due to torsion. Further, since rockshaft 124 behaves essentially as a spring, it is possible to have oscillations which can increase in amplitude. One remedy for this effect is to dig in even deeper to stabilize the implement. Thus, once again, may motivate the operator to place sweep plow blade assembly 142 at a lower level when the most efficient configuration is to have the sweep plow blades as close to the surface as possible.

The above described disadvantages of prior art implement 110 highlight the considerable advantages of sweep plow implement 10. The above described frame flexure effect has been greatly reduced because the sweep plow blade assembly drag and negative lift forces are reacted by a rigid triangular structure including actuator 30, wheel strut 26 and frame 12, instead of being reacted by a long section of generally flat frame structure which has a limited capability for resisting bending forces. Accordingly, frame 12 does not warp or bend because of forces arising from the drafting of sweep plow blade assembly 42 through the soil, or if frame 12 does warp or bend, it does so to a degree which is not significant. Accordingly, sweep plow blade assembly 42 remains in a generally level orientation as shown in FIG. 3 and does not dig in nose down into the soil.

Rockshaft 24 of sweep plow implement 10 is not available to act as a torsional spring for the wheels. This is because actuator 30 of sweep plow implement 10 connects directly between frame 12 and wheel strut 26 preferably from a location on frame 12 behind standard 50 to the lower end of wheel strut 26 at a location which is preferably proximate to wheel 28. Accordingly, with sweep plow implement 10, vertical displacements due to the springing, bouncing action of the rockshaft are generally eliminated. In effect, a torsional spring of the prior art implement is replaced by a rigid triangular structure of the present implement. Thus, wheel 28 is rigidly supported and remains stable. Accordingly, because of these important differences in the configuration of sweep plow implement 10, it is possible to place sweep plow blade assembly 42 at a much shallower depth. The applicant has tested the effective and highly successful use of this implement at a depth of approximately 2.5 inches as opposed to a minimum depth of at least 4 inches which is typically necessary for a prior art implement.

The advantages of being able to draft a sweep plow blade as such a shallow depth are significant. First, the drag produced by such a shallow draft is considerably smaller than with a deeper draft. Consequently, it is possible to run at a faster speed. Because such a shallow layer is being pealed back from the surface, it is much more likely that sweep plow blade 42S will flip weeds into position in which the weed rootball is exposed thereby virtually insuring that the weed will perish. In fact, the applicant has noticed that the weed rootballs are so consistently exposed when running a sweep plow blade at such a shallow depth that it is usually not necessary to use mulch treaders (which are adapted to flip weeds to expose weed rootballs). This further decreases the amount of power needed to draft the implement. The applicant has also noticed that shallow drafting makes it possible for implement 10 to decrease surface variation across a field. This makes it possible to plant seed at a more uniform depth which promotes uniform and productive plant growth. Thus, the advantages of sweep plow implement 10 are numerous and important when compared to the prior art. The speed at which sweep plow implement 10 may be drafted is increased, the power required to do so is decreased along with fuel consumption and the results of the cultivation done by sweep plow implement 10 are superior to what can be done with prior art implements.

The skilled reader should note that in the above detailed description the applicant has attempted to explain why the sweep plow implement of the present application is able to maintain a shallow draft depth and thereby to operate effectively and efficiently. Such explanations are only the applicant's best attempt to explain why the present sweep plow is able to maintain a relatively shallow draft for improved operations. Some details presented above, such as specific load paths and the like could be in error. Such details should not be understood to be part of the invention taught and claimed in this application.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A sweep plow implement, comprising:
(a) a frame that is adapted for being pulled by a tractor, the frame extending longitudinally from a forward end to a back-end and extending transversely between a left side and a right side,
(b) a carriage structure including at least two wheel assemblies, each wheel assembly including a wheel strut, an actuator and a wheel, the wheel strut having a proximal end and a distal end and being pivotably mounted at its proximal end at least indirectly to the frame at a wheel strut attachment location, each wheel strut having a wheel mounted at its distal end each actuator of each wheel assembly having a proximate end that is pivotably connected at least indirectly to the frame at an actuator attachment location, the wheel strut attachment location being forward of the actuator attachment location, the at least one actuator further presenting a distal end which is pivotably connected at least indirectly to the wheel strut at a location that is spaced from the wheel strut attachment location, the actuator being able to move between a first retracted position such that the wheel is pivoted rearward with the wheel strut and toward the frame so that the frame is supported in a first lowered operating position, and a second extended position such that the wheel is pivoted forward with the wheel strut so that the wheel is spaced away from the frame so that the frame is supported in a second raised transport position,
(c) at least one sweep plow assembly that includes a standard and a sweep plow blade assembly that presents a sweep plow blade, the standard having a proximal end that is fixed to the frame and an opposite distal end, the sweep plow blade assembly being fixed to the distal end of the standard, the standard being fixed to the frame such that the sweep plow blade assembly is positioned under the frame, the standard being fixed to the frame between the wheel strut attachment location and the actuator attachment location, the standard and the sweep plow blade assembly being arranged such that the sweep plow blade is positioned below the ground surface when the frame is in the first lowered operating position and such that the sweep plow blade is elevated above the ground surface when the frame is in the second raised transport position.

2. The sweep plow implement of claim 1, wherein:
the carriage structure includes at least two wheel assemblies and at least two actuators are arranged to actuate the at least two wheel assemblies in unison.

3. A sweep plow implement, comprising:
(a) a frame that is adapted for being pulled by a tractor, the frame extending longitudinally from a forward end to a back end and extending transversely between a left side and a right side,
(b) a carriage structure including right and left wheel assemblies, each wheel assembly including a wheel strut, an actuator and a wheel, each wheel strut having a proximal end and a distal end and being pivotably mounted at its proximal end at least indirectly to the frame at a first longitudinal frame location, each wheel strut having a wheel mounted at its distal end, a pair of transversely spaced apart actuators, each actuator having a proximate end that is pivotably connected at least indirectly to the frame at a second longitudinal frame location and a distal end that is pivotably connected at least indirectly to the one of the wheel struts at a location that is spaced away from the proximal end of the wheel strut, the first longitudinal frame location and the second longitudinal frame location being spaced apart and being disposed between front end of the frame and the back end of the frame, the first longitudinal frame location being forward of the second longitudinal frame location, the actuators being arranged for movement in unison between a first retracted position such that the wheels are retracted rearwardly and toward the frame so that the frame is supported in a first lowered operating position, and a second extended position such that the wheels are extended forward and away from the frame so that the frame is supported in a second raised transport position, (c) at least one sweep plow assembly including a standard and a sweep plow blade assembly that further includes a sweep plow blade, the sweep plow blade assembly being fixed to the standard and the standard being fixed to the frame such that the sweep plow assembly is supported under the frame and is oriented so that the sweep plow blade is generally parallel to the frame, the standard being fixed to the frame at a third longitudinal frame location that is between the first and second longitudinal frame locations, the standard and the sweep plow blade assembly being arranged such that the sweep plow blade is positioned below the ground surface when the frame is in the first lowered operating position and such that the sweep plow blade is elevated above the ground surface when the frame is in the second raised transport position.

4. The sweep plow implement of claim 3, wherein:
the proximal ends of the wheel struts are fixed to a rock shaft which is pivotably mounted to the frame at the first frame location.

5. A sweep plow implement, comprising:
(a) a frame that is adapted for being pulled by a tractor, the frame being arranged in a generally horizontal plane and extending longitudinally from a forward end to a back end and extending transversely between a left side and a right side, (b) a carriage structure including a transverse rockshaft that is rotatably mounted to the frame at a first longitudinal frame location, the rockshaft presenting a left end and an opposite right end, a first wheel strut fixed to the left end of the rockshaft and a second wheel strut fixed to the right end of the rockshaft, each wheel strut presenting a distal end that is spaced away from the rockshaft, at least one wheel rotatably mounted to each distal end of each wheel strut, a pair transversely spaced apart actuators, each actuator having a proximate end that is pivotably connected at least indirectly to the frame at a second longitudinal frame location and a distal end that is pivotably connected at least indirectly to the distal end of one of the wheel struts, the first longitudinal frame location and the second longitudinal frame location being spaced apart and being disposed between front end of the frame and the back end of the frame, the first longitudinal frame location being located forward of the second longitudinal location, the actuators being arranged for adjustable movement in unison between a first retracted position such that the wheels are pivoted toward the rear end of the frame and toward the frame so that the frame is supported in a first lowered operating position, and a second extended position such that the wheels are pivoted forward and away from the frame so that the frame is supported in a second raised transport position, (c) at least one sweep plow assembly including a standard and a sweep plow blade assembly including a sweep plow blade, the sweep plow blade assembly being fixed to the standard and the standard being fixed to the frame such that the sweep plow assembly is supported under the frame and is oriented so that the sweep plow blade is generally parallel to the frame, the standard being fixed to the frame at a third longitudinal frame location that is between the first and second longitudinal frame locations, the standard and the sweep plow blade assembly arranged such that the blade assembly is positioned below the ground surface when the frame is in the first lowered operating position and such that sweep plow blade assembly is elevated above the ground surface when the frame is in the second raised transport position.

* * * * *